(No Model.)
S. MANEER.
NECK YOKE COUPLING.
No. 333,768. Patented Jan. 5, 1886.
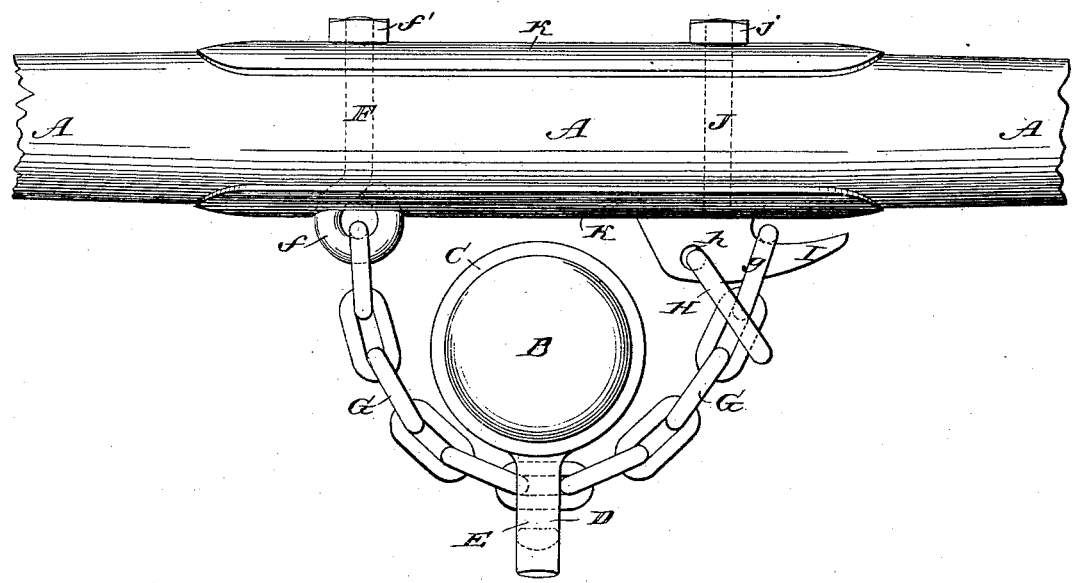
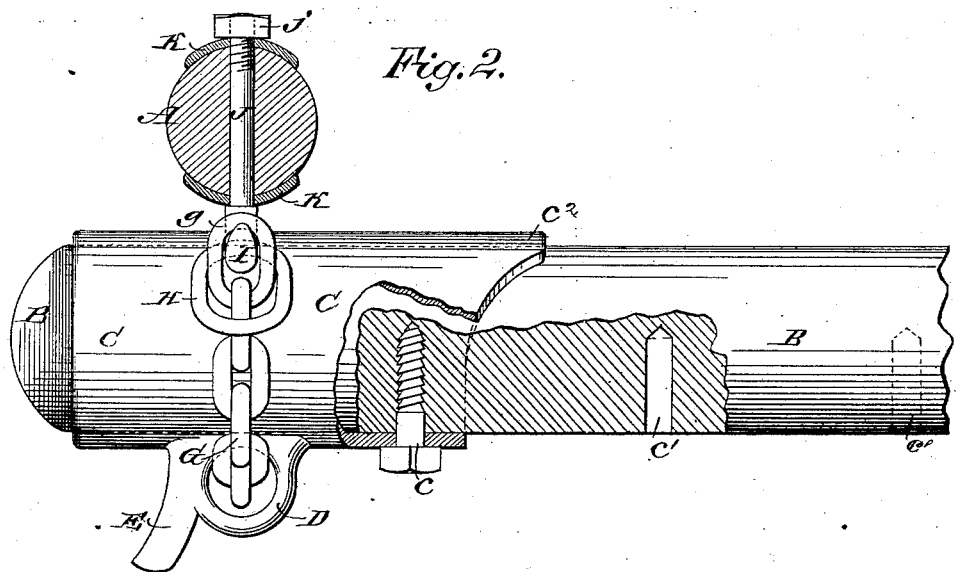
WITNESSES:
INVENTOR:
BY Munn & Co.
ATTORNEYS.

UNITED STATES PATENT OFFICE.

SAMUEL MANEER, OF CRAIGVALE, ONTARIO, CANADA.

NECK-YOKE COUPLING.

SPECIFICATION forming part of Letters Patent No. 333,768, dated January 5, 1886.

Application filed October 8, 1885. Serial No. 179,334. (No model.)

*To all whom it may concern:*

Be it known that I, SAMUEL MANEER, of Craigvale, in the Province of Ontario and Dominion of Canada, have invented a new and Improved Neck-Yoke and Tongue Coupling, of which the following is a full, clear, and exact description.

My invention relates to couplings for holding the neck-yokes of horses or other animals to the tongues of vehicles, and has for its object to provide a cheap and durable coupling which will afford a secure and reliable attachment of the yoke to the tongue, and permit their easy disconnection, when desired, and, withal, allow the neck-yoke to readily be adjusted along the tongue to suit the size of the draft-animals.

The invention consists in certain novel features of construction of the coupling, and its combination with the neck-yoke and tongue, all as hereinafter fully described and claimed.

Reference is to be had to the accompanying drawings, forming part of this specification, in which similar letters of reference indicate corresponding parts in both the figures.

Figure 1 is a front view of a neck-yoke—in part—and a tongue connected by my improved coupling; and Fig. 2 is a view of the neck-yoke, tongue, and coupling, taken at right angles to Fig. 1, and with parts broken away and in section.

The letter A indicates the neck-yoke, the central part only of which is shown in the drawings, and B is the tongue, the end portion only of which is shown. On the tongue B is fitted, or so it may be moved along it, the metal collar or sleeve C, which may be held to the tongue in any required position to suit the size of the draft-animals by means of the heavy bolt or screw $c$, which may enter any one of a series of holes, $c'$, made in the tongue. The collar C is provided with an eye or loop, D, which will be formed directly behind the holdback-lug E, which, as shown, projects from the under face of the collar C, near its forward end.

At F is shown an eyebolt, which is passed through the neck-yoke and receives a nut, $f'$, at its upper end, to bind it to the yoke; and to the eye $f$ of the bolt is linked one end of a chain, G, which chain is passed under the tongue through the eye D of the tongue-collar C, and thence upward through the snatch-ring H, and the chain then is linked to or upon the hook I, formed on the head of the bolt J, which bolt is passed through the neck-yoke A, and is held thereto by a nut, $j$, screwed onto it above the neck-yoke. The snatch-ring H is held loosely in an eye or hole, $h$, formed in the head of the bolt J, in such relation to the end of the hook I that, as the tongue B hangs in the bight of the chain G, the weight of the tongue, aided by the gravity of the snatch-ring H, will not allow the link $g$ of the chain engaged with the hook I to slip from the hook; hence the neck-yoke and tongue cannot easily be uncoupled by the shifting of the yoke or tongue on each other caused by the movements of the animals which may be yoked to a vehicle by them.

The chain G when hooked to hook I has just sufficient length or slackness to allow it to be unhooked when the tongue is raised to the neck-yoke.

The letters K K indicate curved metal plates, which are held at the upper and lower faces of the neck-yoke by the bolts F J, and give a firm fastening for the bolts to the yoke. The lower plate, K, protects the yoke from wear by friction on the tongue, and the upper portion of the collar C is extended backward sufficiently, as at $c^2$, or the collar is long enough to protect the tongue B from wear by friction of the neck-yoke on it.

It is evident that the eye or loop D forms an effective holdback for the yoke when the chain G is used, and that in such case the holdback-lug E is not necessary; but by providing said lug neck-yokes having the ordinary holdback ring, which slips onto the tongue, may be used with the tongue-collar C, and in such case the holdback-ring will act against the holdback-lug E; hence neck-yokes fitted either with my chain-and-hook coupling or with the ordinary ring may be used to advantage with a vehicle-tongue fitted with the collar C, as will readily be understood.

Having thus described my invention, what I claim as new, and desire to secure by Letters Patent, is—

1. In neck-yoke and tongue couplings, the combination, with the neck-yoke A, of the chain G, held at one end to the yoke, and a hook, I, secured to the yoke and provided with the snatch-ring H, substantially as herein set forth.

2. A neck-yoke and tongue coupling comprising a chain, G, held at one end to the neck-yoke, a hook, as at I, fixed to the yoke and provided with a snatch-ring, H, through which the chain is adapted to be passed prior to hooking it to the hook I, and a collar, C, held to the tongue, and provided with an eye, D, to receive the bight of the chain G, substantially as herein set forth.

3. A neck-yoke and tongue coupling comprising a chain, G, held at one end to the neck-yoke, a hook, as at I, held to the yoke, and provided with a snatch-ring, H, and a collar, C, held to the tongue so as to be adjusted along it, and provided with an eye, D, to receive the bight of the chain G, substantially as herein set forth.

4. In a neck-yoke and tongue coupling, the combination, with the yoke A, of the eyebolt F, the chain G, connected therewith, the bolt J, having a hook-head, I, and a snatch-ring, H, and the collar C, fitted adjustably on the tongue B, and provided with an eye, D, through which the bight of chain G is passed, and said chain then being passed through the ring H and hooked onto hook I, substantially as herein set forth.

5. In neck-yoke and tongue couplings, the collar C, fitted adjustably to the tongue, and provided with the eye D and the lug E, substantially as herein set forth.

SAMUEL MANEER.

Witnesses:
HAUGHTON LENNOX,
*Barrister, Barrie.*
GEO. L. LENNOX,
*Student-at-Law, Barrie, Ont.*